United States Patent [19]

Gerety

[11] Patent Number: 4,750,082

[45] Date of Patent: Jun. 7, 1988

[54] CAPACITIVE RATIOMETRIC LOAD CELL

[75] Inventor: Eugene P. Gerety, Seymour, Conn.

[73] Assignee: Pitney Bowes Inc., Stamford, Conn.

[21] Appl. No.: 103,331

[22] Filed: Oct. 1, 1987

[51] Int. Cl.[4] .......................... H01G 7/00; G01G 3/14
[52] U.S. Cl. .................................. 361/283; 177/210 C
[58] Field of Search ...................... 361/278, 283, 290; 73/718, 724; 177/210 C

[56] References Cited

U.S. PATENT DOCUMENTS

| | | | |
|---|---|---|---|
| 2,547,780 | 4/1951 | Reynst | 175/41.5 |
| 3,566,222 | 2/1971 | Wolfendale | 361/283 |
| 3,702,957 | 11/1972 | Wolfendale | 361/283 |
| 4,237,989 | 12/1980 | Lewis | 177/210 C |
| 4,294,321 | 10/1981 | Wittlinger et al. | 177/210 C X |
| 4,308,929 | 1/1982 | Estavoyer | 177/210 C |
| 4,461,363 | 7/1984 | Loy | 177/210 C X |
| 4,523,474 | 6/1985 | Browne et al. | 73/718 X |
| 4,524,840 | 6/1985 | Stuart | 177/210 C |
| 4,558,600 | 12/1985 | Lee | 177/210 C X |
| 4,561,038 | 12/1985 | Hatton et al. | 361/280 |
| 4,572,006 | 2/1986 | Wolfendale | 177/210 C X |
| 4,629,019 | 12/1986 | Harrington et al. | 177/210 C |
| 4,656,871 | 4/1987 | Czarnocki | 73/724 |
| 4,661,768 | 4/1987 | Carusillo | 324/60 C |
| 4,679,643 | 7/1987 | Bové | 177/210 C |
| 4,683,754 | 8/1987 | Hirata et al. | 73/718 X |

FOREIGN PATENT DOCUMENTS 1226644 9/1987 Canada .
1909979 2/1969 Fed. Rep. of Germany .

OTHER PUBLICATIONS

Capacitive Transducers (Foldvari et al.) Instruments & Coated Systems, Nov. 1964, vol. 37, pp. 77 to 85.

Primary Examiner—Donald A. Griffin
Attorney, Agent, or Firm—Gerald E. Linden; David E. Pitchenik; Melvin J. Scolnick

[57] ABSTRACT

Two spaced-apart outer elements are adapted to be excited by an oscillator. An inner element is disposed therebetween and provides a signal indicative of its spacing relative to the other elements. The signal is processed to determine this position. The elements are arranged on a flexure that is responsive to a load to form a load cell wherein the signal from the inner element is indicative of the magnitude of the load. Various flexure arrangements are disclosed. The elements are preferably parallel plates, having a surface area substantially greater than their separation. In an embodiment of the invention, the inner plate is bifurcated longitudinally, forming two nominally-coplanar inner plates, to offset the effects of off center loading on the flexure with respect to the output of the load cell.

8 Claims, 3 Drawing Sheets

CAPACITIVE RATIOMETRIC LOAD CELL

TECHNICAL FIELD OF THE INVENTION

The invention relates to capacitive transducer load cells and, more particularly, to the use of such a load cell in an electronic scale for weighing articles such as letters and parcels.

BACKGROUND OF THE INVENTION

Electronic scales for weighing articles such as letters and parcels are well known. Typically, in such a scale, a strain gauge transducer is arranged to respond to the weight of an article on a platen so as to provide a signal indicative of the weight of the article to a display device such as a numeric readout. However, strain gauges are expensive and difficult to mount (e.g., glue) to a structure with accuracy.

U.S. Pat. No. 4,629,019, entitled WEIGHT SCALE UTILIZING A CAPACITIVE LOAD CELL, discloses in FIGS. 8 and 8A a so called differential capacitor load cell having two coaxial, spaced-apart conductive cylindrical electrodes 128, 128′ and a coaxial, conductive piston 124 disposed within the cylindrical electrodes in response to a load on a spring loaded platform 110. A capacitance is formed by the piston and each of the cylindrical electrodes. The piston is grounded, and the cylindrical electrodes are alternately connected (multiplexed) to the input of an oscillator circuit, FIG. 6, the output of which is a signal whose frequency is dependent on the position of the piston relative to the rings. The multiplexing allows for temperature compensation, but the arrangement is prone to fringing (edge) effects.

U.S. Pat. No. 3,702,957, entitled VARIABLE CAPACITANCE DISPLACEMENT TRANSDUCERS, discloses a capacitive position transducer comprising first and second capacitor plate electrodes disposed adjacent to each other, a common capacitor plate electrode disposed uniformly spaced from said first and second plate electrodes, and a screen guided for movement in the space between said first plate electrode and said common plate electrode whereby the ratio of capacitances between said first plate electrode and the common plate electrode and said second plate electrode and the common plate electrode varies in accordance with the position of said screen.

U.S. Pat. No. 4,561,038, entitled TRANSDUCERS, discloses a transducer comprising a capacitor incorporating two sets of rigid, electrically conductive plates interleaved one with the other, with spacing between them, the two sets of plates being movable relative to each other in a direction which maintains the spacing substantially constant, and the shape and/or disposition of the plates being such that when an oscillating voltage is applied across the capacitor an output signal derived from an intermediate plate varies with changes in the relative positions of the two sets of plates. The plates are preferably planar with relative movement being arranged to take place in the planes of the plates.

U.S. Pat. No. 3,566,222, entitled CAPACITIVE DISPLACEMENT TRANSDUCER, discloses two cylindrical coaxial reference electrodes (1 and 2) disposed side by side, and a coaxial cylindrical reference electrode (3) disposed within the reference electrodes for movement along the axis to vary the capacitive couplings between the moving electrode and the respective reference electrodes as a function of position. An oscillator (30) is connected to the reference electrodes and across an inductive potential divider (31). The divider or the movable electrode is adjusted to establish an "earth potential" position for the movable electrode (see column 3, lines 51–65).

In the aforementioned, '019, '957, '038 and '222 Patents, two or more capacitances are formed by three or more conductive elements. However, the "spacing", per se, of the conductive elements remains fixed.

U.S. Pat. No. 4,461,363, entitled HIGH-SPEED CAPACITIVE WEIGHING METHOD AND APPARATUS, discloses a set of fixed plates (12 and 16), forming a capacitor, through which an object is dropped to determine its mass. A separate, reference capacitor is involved.

U.S. Pat. No. 4,679,643, entitled CAPACITIVE WEIGHING DEVICE, discloses a capacitive plate electrode supported on a load-receiving spring plate and a fixed capacitive plate electrode. The spacing between the two capacitive plate electrodes varies in response to a load.

U.S. Pat. No. 4,656,871, entitled CAPACITOR SENSOR AND METHOD, discloses a circuit responsive to the capacitance changes in a variable, parameter responsive capacitor, $C_s$.

U.S. Pat. No. 4,524,840, entitled ELECTRONIC SCALE WITH NON-PARALLEL CAPACITANCE MEANS, discloses a single capacitor transducer in a scale wherein two plates a fixed plate and a movable plate are disposed so as to be nonparallel to each other over the entire range of movement of the movable plate.

U.S. Pat. No. 4,308,929, entitled INTEGRAL PARALLELOGRAM CHARGE RECEIVER AND CAPACITIVE TRANSDUCER discloses a capacitive transducer formed by two plates 320 and 343 within a deformable parallelogram structure. The spacing of the plates varies in response to a load Q applied to a side of the parallelogram structure, but the plates 320,343 do not remain parallel when their spacing changes (see FIG. 1A).

U.S. Pat. No. 2,547,780, entitled CAPACITIVE PICKUP FOR PRESSURE INDICATORS, discloses a bridge circuit for determining the output of a capacitive pressure sensor.

The aforementioned '363, '643, '871, '840, '929 and '780 patents disclose single capacitor transducers.

U.S. Pat. No. 4,523,474, entitled CAPACITIVE PRESSURE SENSOR discloses a parallel plate arrangement for sensing pressure. The spacing of the plates changes in response to applied pressure. Multiple sets of parallel plates may be employed.

U.S. Pat. No. 4,661,768, entitled CAPACITANCE TRANSDUCING METHOD AND APPARATUS, discloses a circuit for determining the capacitance of an unknown capacitor.

U.S. Pat. No. 4,683,754, entitled CAPACITIVE DISPLACEMENT TRANSDUCER, discloses a pair of differential capacitors formed with a movable electrode disposed between two outer, fixed electrodes. The oscillation frequency of a self-excited oscillator circuit is counted by a counter and the output level of the counter is reversed each time a certain count is attained to cause the differential capacitances to be switched alternatively, thereby eliminating the effect of fixed (stray) capacitances formed across the differential capacitors. The movable electrode is shown in FIG. 1 to be acted upon by a linkage 19 passing through holes in the fixed outer plates to pressure sensitive diaphragms 11 and 12. Having holes through the outer plates i.e. "rings" tends to cause more fringe effects, and the switching arrangement of the '754 patent is a somewhat complex approach to eliminating the effect of stray capacitances.

Offenlegungsschrift No. 1,909,979, entitled KAPAZITIVER DRUCKGEBER (Capacitive Pressure-Sensor), discloses a metal plate 4 interposed in parallel between two metal rings 6 and 7. The spacing of the plate 4 changes differentially with respect to the plates 6 and 7. A hole through the metal rings 6 and 7 is required in this embodiment—much like it was in the '754 Patent.

U.S. Pat. No. 4,572,006, entitled LOAD CELLS, discloses a capacitive transducer arrangement wherein, e.g. in FIGS. 1 and 3, two capacitors are formed within a parallelogram flexure. One capacitor is a reference capacitor having a relatively constant valve, while the other capacitor varies in capacitance according to a load, P, along a side of the flexure. In FIG. 4, a differential capacitor arrangement is shown. In this case a movable element 11 has a pair of capacitor electrodes 23 and 24 attached to its upper and lower faces which are adjacent to a pair of fixed capacitor electrodes 26 and 27. The electrodes 23 and 24 are not indicated as being connected to each other and occupy only a small portion of the available space within the flexure. The area of the electrodes is not much larger than their spacing.

An Article entitled CAPACITIVE TRANSDUCERS (p77 et seq of November 1964 Instruments & Control Systems) discloses at page 80 the underpinnings of the above described differential capacitor arrangements, such as are disclosed in the aforementioned '754, '979 and '006 patents.

U.S. Pat. No. 4,237,989, entitled CAPACITIVE LOAD CELL AND METHOD OF MANUFACTURE, discloses a dual capacitor arrangement wherein two plates 26 and 27 are mounted to either face of a central, movable member of a flexure, and are spaced apart from two outer plates, 33 and 34 quite like the FIG. 4 embodiment of the '006 patent. As shown in FIG. 9 of the patent, two variable capacitors 31 and 32 are formed thereby, each capacitor affecting the frequency of an oscillator 91 and 92, respectively.

SUMMARY OF THE INVENTION

It is an object of this invention to provide a load cell suitable for use in an electronic scale, that is inexpensive, inherently linear, and relatively easy to manufacture.

According to the invention two spaced-apart outer elements are adapted to be excited by an oscillator, and an inner element is disposed between the two outer elements. A capacitive potentiometer is formed thereby. The inner element provides a signal, in response to the excitation of the outer elements, indicative of the spacing of the inner element with respect to the outer elements.

Preferably, the elements are parallel plates having a surface area substantially greater (such as by a factor of 100) than the nominal distance between the inner element and the outer elements, in order to minimize fringe effects. The spacing between the outer plates remains constant, but the spacing of the inner plate with respect to the outer plates varies as the distance between the inner plate and the two outer plates changes in response to a measured parameter such as force or displacement.

In an embodiment of the invention the outer elements are mounted to a relatively immovable portion of a bending-beam flexure, and the inner element is mounted to a relatively movable (load responsive) portion of the flexure.

In another embodiment of the invention, the inner element is mounted to a relatively immovable side of a parallelogram-type flexure, and the outer elements are mounted to a relatively movable (load responsive) side of the flexure. All of the elements are advantageously disposed within the flexure.

In either of the aforementioned embodiments, the inner element may be bifurcated longitudinally forming, in essence, two coacting capacitive potentiometers, to compensate for off center loadings tending to skew the plates.

The transducer of this invention is relatively simple to manufacture, and inexpensive. For instance, the inner and outer elements may be screw mounted to the flexure with great facility and accuracy.

Other objects, features and advantages of the invention will become apparent in light of the following description thereof.

DETAILED DESCRIPTION OF THE INVENTION

Figure 1:
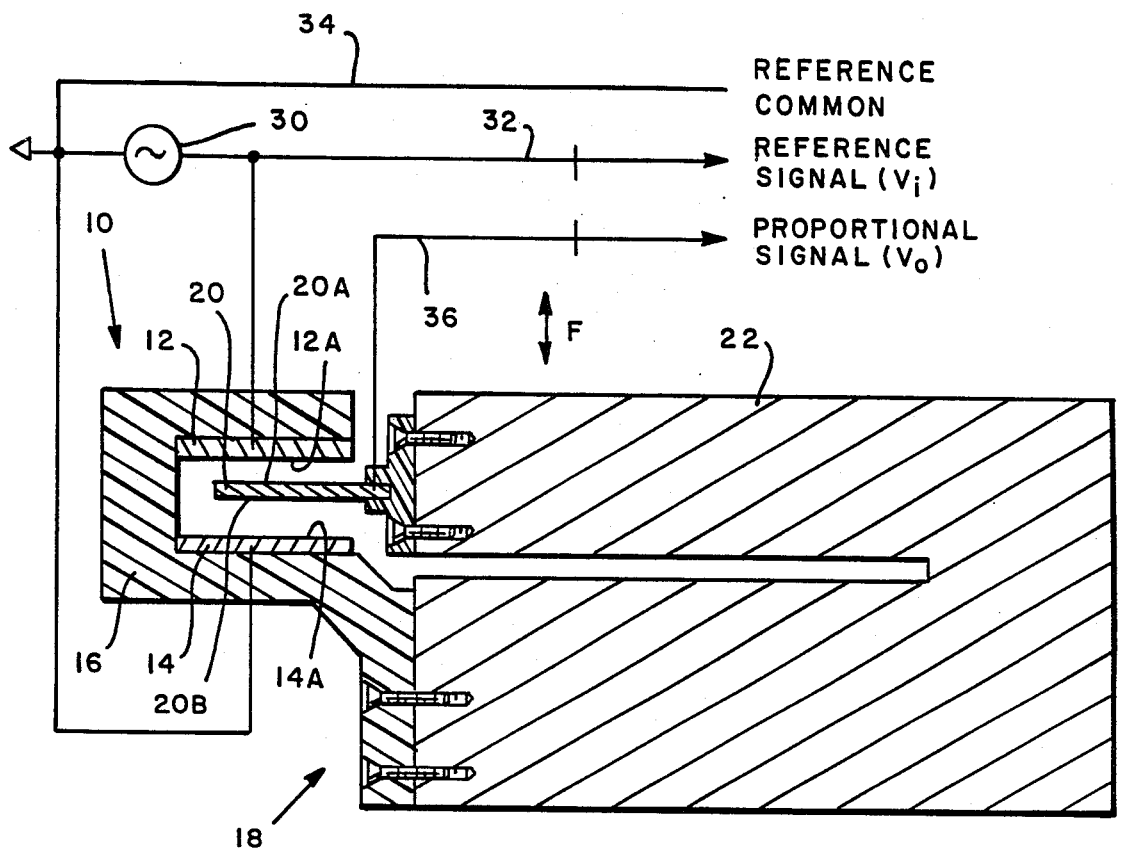
FIG. 1 is a side cross-sectional view of an embodiment of the invention.

FIG. 1 shows an embodiment 10 of the capacitive ratiometric Load Cell of this invention. Two similar, parallel, spaced-apart, electrically-conductive, flat plates, an upper plate 12 and a lower plate 14, are supported by a relatively immovable (stationary) portion 16 of a structure 18. A third electrically-conductive plate 20 is supported by a relatively movable portion 22 of the structure 18 so as to be parallel to and largely, such as at least 90% interleaved (by surface area) between the two immovably mounted plates 12 and 14. The portion 22 of the structure 18 forms a bending beam flexure which is responsive to a load, F, applied thereto, as described in greater detail hereinafter.

The plate 20 has an upper surface 20A that is nominally parallel to and spaced apart a distance, d1, from a lower surface, 12A, of the plate 12. The plate 20 has a lower surface 20B that is nominally parallel to and spaced apart a distance, d2, from an upper surface 14A of the plate 14.

Thus, the upper surface 20A of the inner plate 20 and the lower surface 12A of the outer plate 12 form a capacitor having a capacitance, C1. In a similar manner, the lower surface 20B of the inner plate 20 and the upper surface 14A of the outer plate 14 form a capacitor having a capacitance, C2. It should be noted, and will be more evident in the embodiments of FIGS. 3 and 4, that the outer plates 12 and 14 are continuous, or "closed" surfaces. In other words they do not have a hole through them, which would contribute to fringe effects.

Assuming that the areas of the aforementioned plate surfaces 12A, 14A, 20A and 20B are each approximately equal to a quantity, A, the following textbook relationships are evident:

$C1 = KeAKo/d1$, and $C2 = KeAKo/d2$, wherein:
d1 and d2 are expressed in centimeters;
C1 and C2 are expressed in picofarads;
Ko is the permittivity of free space;
Ke is the dielectric constant of the medium (typically air) between the surfaces;
Edge (fringe) effects can be ignored when $A >> d1$ or d2.

In FIG. 1, it is evident that a force (load), F, applied either upwardly or downwardly to the relatively movable (load responsive) bending beam portion 22 of the structure 18 will cause the distances d1 and d2 to vary, but that their sum, d1+d2 will remain constant.

Hence, the pair of surfaces 12A and 20A and the pair of surfaces 14A and 20B can be viewed as forming two variable capacitors connected in series, the capacitances of which vary differentially in a predictable manner based on the differential variation in spacing of the plate 20 relative to the plates 12 and 14. In other words, the plates 12, 14 and 20 form a capacitive potentiometer, the plate 20 representing the "wiper" thereof, the differential "spacing" of which, relative to the plates 12 and 14 varies in response to the measured parameter, F.

As shown in FIG. 1, the portion 16 of the structure 18 is advantageously formed of an electrically insulative material, such as plastic, and fixed to the portion 22 of the structure 18. Similarly, the plate 20 is advantageously mounted to the portion 22 of the structure by an electrically insulative bracket 24. Screws may be used to assemble these various elements, as shown.

The bending beam portion 22 of the structure is shown as metallic (as indicated by the cross-hatching). However, it may be of plastic or other nonmetallic construction depending upon the application of the load cell. Advantageously, the load indicating range and sensitivity of the load cell can be changed by changing the modulus and configuration of the bending beam flexure.

An oscillator 30 provides an alternating current signal on two lines, a "reference signal" of magnitude, Vi, on a line 32 connected to the plate 12 and a "reference common" (ground) on a line 34 connected to the plate 14. A line 36 is connected to the plate 20 to provide a "proportional signal" of magnitude, Vo, indicative of the position of the plate 20 with respect to each of the plates 12 and 14, in response to the oscillator excitation of the plates 12 and 14. The following relationship is evident:

$Vo(s) = Vi(s) \, C1/(C1+C2)$ wherein s is the laplacian operator.

Using the earlier stated equation for C1 and C2, it is evident that:

$Vo(s) = Vi(s) \, d2/(d1+d2)$

It is of no little consequence or significance that the dielectric constant, Ke, of the medium between the plates ultimately drops from the equation for Vo(s). In an electronic scale operating in a mailroom, for instance, the humidity of the air would be inconsequential.

Thus, the ratio of the reference signal, Vi, to the proportional signal, Vo, is a predictable function of the position of the plate 20 with respect to the plates 12 and 14. These signals, Vi and Vo, may be processed in a suitably programmed microprocessor, or in an analog circuit, to determine the position of the plate 20, and hence (when the elastic characteristic of the element 16 is known) the magnitude of a force (load) acting upon the relatively movable portion 22 of the structure 18.

Figure 2:
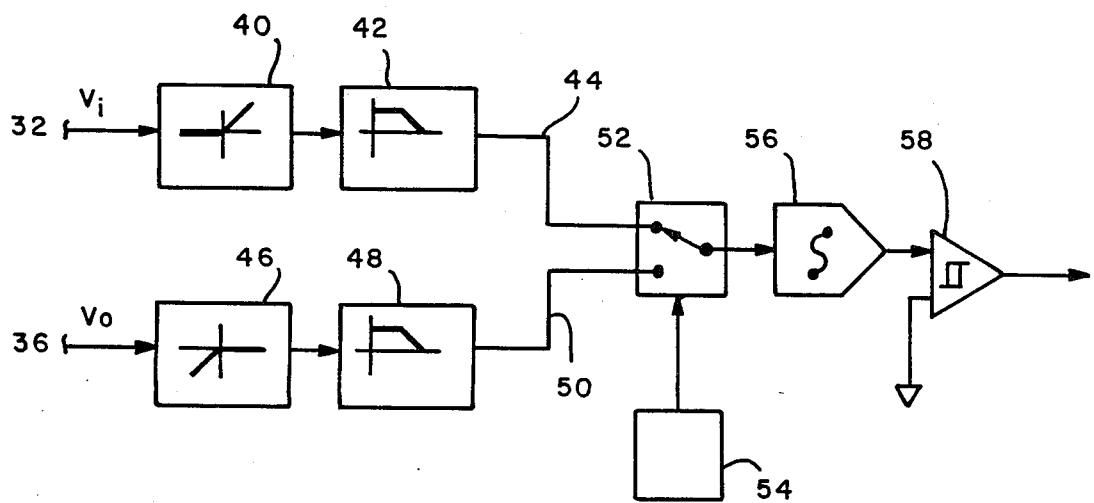
FIG. 2 is a schematic of a circuit suitable for use with the invention, as shown in FIGS. 1 and 3.

FIG. 2 shows an analog circuit for processing the reference signal and the proportional signal. The circuit shown would readily be converted to software instructions by one skilled in the art of programming.

The reference signal Vi on the line 32 is provided to a rectifier 40, and thereafter to a low pass filter 42, to provide the D.C. component of the reference signal on a line 44.

In a similar manner, the proportional signal on the line 36 is provided to a rectifier 46 of opposite polarity to the rectifier 40, and thereafter to a low pass filter 48, to provide the D.C. component of the proportional signal on a line 50. The opposite polarity of the two rectifiers 40 and 46 offers the opportunity to eliminate much of the effect of offset voltages in the reference and proportional signals. Since the independence of the capacitors C1 and C2 is constant at a given frequency, filters could be provided in the lines to the rectifiers 40 and 46 to eliminate any noise.

The reference signal on the line 44 and the proportional signal on the line 50 are provided to a switch 52. A ramp control signal from a timing circuit 54 exercises control over the switch 52 so that the reference and proportional signals are alternately, and for suitably equal time periods, provided to a dual slope integrator 56 which integrates the signals according to the formula:

$Vo = -Vi \, t$

The output of the integrator 56 is provided to a comparator 58, the other input of which is set at ground level. Thus, the output of the comparator 58 is predictably a function of Vi/Vo which, as determined hereinbefore, is indicative of d2/(d1+d2). Hence the position of the plate 20 may be determined.

It is preferable that the comparator have hysteresis, to avoid dithering.

In practice, a system such as is described above will have nonlinearities and scale factor errors, but these will be fixed. One skilled in the art to which this invention pertains will appreciate that these nonlinearities and scale factor errors may readily be calibrated and calculated out using standard curve-fitting techniques.

Figure 3:
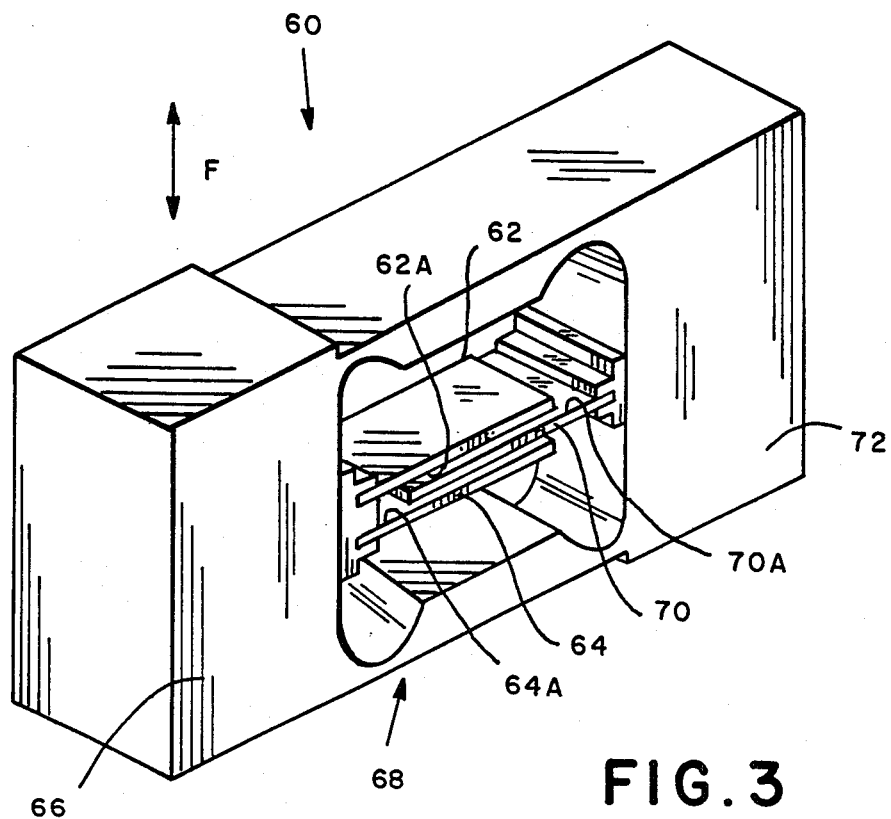
FIG. 3 is a perspective view of an alternate embodiment of the invention.

FIG. 3 shows an alternate embodiment 60 of the capacitive ratiometric transducer of this invention. Therein two parallel, spaced-apart electrically-conductive plates, an upper plate 62 and a lower plate 64, are supported by a relatively movable portion, a side 66 of a parallelogram-type flexure (structure) 68, within the structure. Again, the outer plates 62 and 64 from "closed" surfaces. A load cell employing a parallelogram structure is disclosed in commonly-owned U.S. Pat. No. 4,485,881, entitled SHIFT ADJUSTMENT FOR A LOAD CELL.

A third electrically-conductive plate 70 is supported by a relatively immovable portion, an opposite side 72 of the structure 68, within the structure, so as to be parallel to and largely, such as at least 90% interleaved between the two movably mounted plates 62 and 64.

As in the previously described embodiment 10 of the capacitive ratiometric transducer of this invention, the plate 70 has an upper surface 70A that is spaced apart a distance, d1, from a lower surface 62A of the plate 62, and a lower surface 70B that is spaced apart a distance, d2, from an upper surface 64A of the plate 64. In a similar manner to the transducer 10, two series-connected variable capacitors are formed by the juxtaposition of the plates 62, 64 and 70, and the techniques previously discussed with regard to exciting the capacitive divider formed thereby with an oscillator and consequently deriving a signal indicative of the position of the third plate 70 with respect to the first two plates 62 and 64 are equally applicable. Again, the overlapping area of the plates is substantially greater than (>>) their spacing from each other.

However, important differences are evident in the embodiment 60 of the capacitive ratiometric transducer, vis-a-vis the earlier described embodiment 10.

In the embodiment 60, the structure 68 is a parallelogram, or four-link structure. The plates 62 and 64 are attached to one (movable load-responsive) side of the parallelogram, and the plate 70 is attached to an opposite (stationary) side thereof. A force, F, applied to the movable side of the parallelogram will cause it to deflect, either upward or downward as illustrated, yet the movable side will always remain parallel to the immovable side. Hence, the outer plates 62 and 64 will always be parallel to the inner plate 70. In contrast thereto, the plate 20 of the embodiment 10 shown in FIG. 1 was described as being "nominally" parallel to the plates 12 and 14. It is evident from the simplistic, bending-beam structure 18 disclosed therein, that as the beam 22 deflects, the parallel relationship of the plate 20 to the plates 12 and 14 diminishes.

By employing a parallelogram-type structure, such as the structure 68 of FIG. 3, there will be fewer nonlinearities to account for in the relationship between capacitances, C1 and C2, and the position of the central plate (e.g., 70) with respect to the two exterior plates (e.g., 62 and 64).

It has been noted that in a transducer such as that of the embodiment of FIG. 3, that off-center (torsional) loading will create a rotational tendency in the plates. "Off-center" loading is defined as a force acting on other than the longitudinal centerlines of the plates. Therefore it has been desirable to form a dual load cell, in the following manner.

Figure 4:
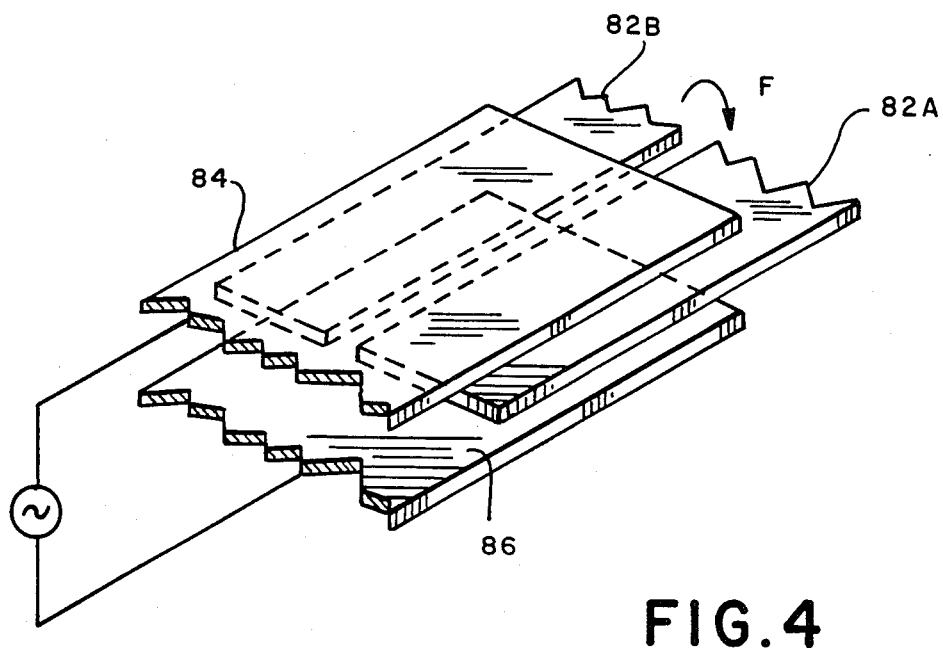
FIG. 4 is a perspective view of another alternate embodiment of the invention.

FIG. 4 shows an embodiment 80 of the capacitive ratiometric transducer of this invention wherein the inner plate 82 is split (bifurcated) longitudinally into two electrically distinct portions 82A and 82B. The portions 82A and 82B are nominally coplanar, and are disposed between two outer plates 84 and 86, which are comparable to the two outer plates 62 and 64 of the embodiment 60. The plates 84 and 86 are excited by an oscillator 30, as discussed with respect to FIG. 1.

Figure 5:
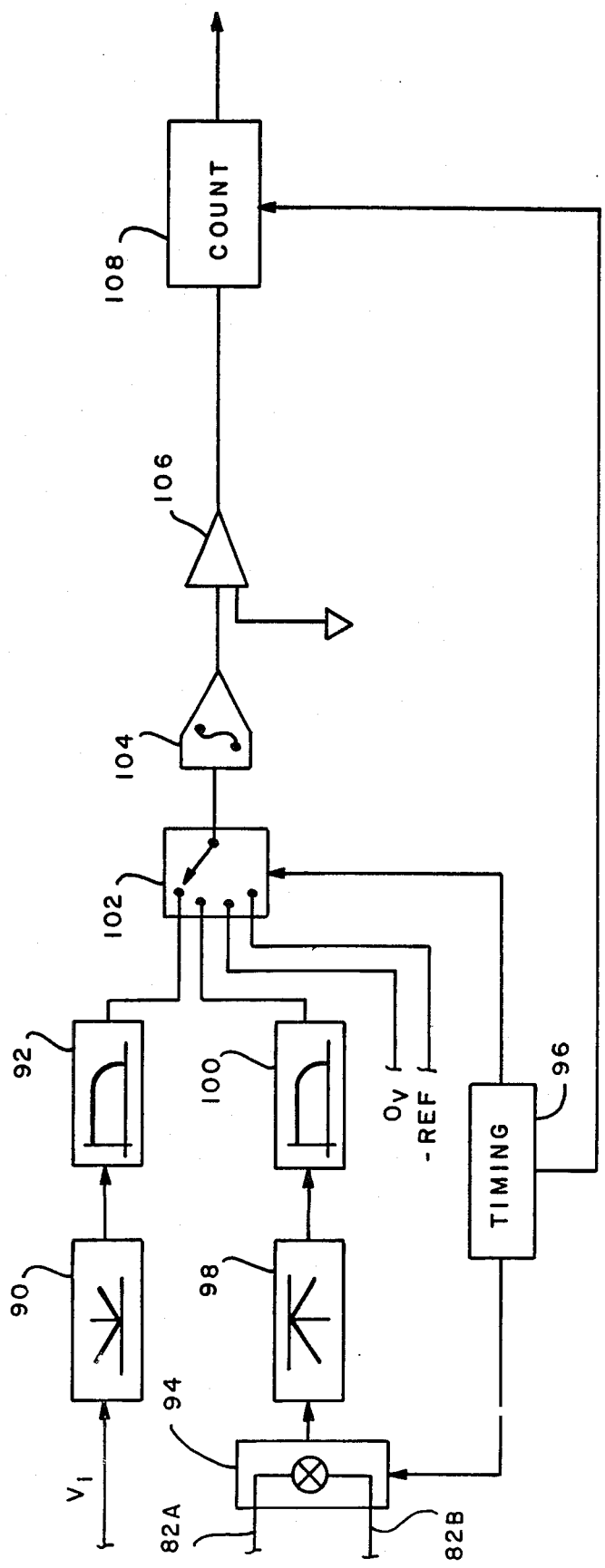
FIG. 5 is a schematic of a circuit suitable for use with the invention, as shown in FIG. 4.

As shown in FIG. 5, a reference signal, Vi, from one of the outer plates, e.g. 84, is provided to a full wave rectifier 90, and thence to a low pass filter 92, so as to extract the D.C. component of the reference signal.

A proportional signal from each of the portions 82A and 82B are provided to a switch 94 which is under the control of a timing circuit 96 so as to be alternately provided to a full wave rectifier 98, of opposite polarity from the rectifier 90, and thence to a low pass filter 100 to extract the D.C. components of the proportional signals.

The outputs of the low pass filters 92 and 100 are provided to a switch 102 which is under the control of the timing circuit 96. The switch 102 also has inputs of 0 volts (ground) and a known negative reference voltage,-Ref. By alternately switching each of the inputs to the switch 102, sequentially to an integrator 104, the output of which is provided to a comparator 106, a signal indicative of Vi/Vo may be generated, and provided to a counting circuit 108, which is under the control of the timing circuit 96. The timing circuit is controlled to cause the overall circuit of FIG. 5 to function either as a dual slope or charge balanced converter. The output of the counting circuit 108 is readily provided to a microprocessor in an electronic scale.

It will be readily understood by those skilled in the art to which this invention pertains that the elastic and electrical properties and configuration of the material or materials chosen for the structures 18 or 68, or any other suitable structure for mounting the capacitive ratiometric transducer of this invention, must be selected with regard to the ultimate application of the invention. For instance, portions of the immovable portion 16 of the structure 18 could be metallic, thereby forming the electrically-conductive surfaces 12A and 14A without the necessity of discrete plates (e.g., 12 and 14). Furthermore, mechanical hysteresis in the structure 18 may be desirable.

An important advantage of the present transducer over a strain gauge type transducer is that a strain gauge must be glued to a structure with great precision to form a transducer assembly. This is a difficult manufacturing procedure. In the present load cell transducer assembly, the plates (e.g. 12, 14, 20) can be bolted to the structure. This is a more tolerant manufacturing procedure.

Other advantages of the transducer of this invention, vis-a-vis a strain gauge, is its inherent low cost and linearity.

Another advantage of this invention, for instance vis-a-vis the aforementioned FIG. 4 embodiment of U.S. Pat. No. 4,572,006, is that the effects of stray capacitances (from each of the three plates of the differential capacitor to ground) are:

minimized by the disproportionately large area of the plates versus the spacing of the plates; and readily accounted for due to the circuit arrangement disclosed (e.g., the stray capacitances from the outer plates create an essentially fixed offset).

What is claimed:

1. A load cell for providing a signal indicative of a load, comprising:
   a structure responsive to a load;
   two electrically-conductive, closed surface, outer elements supported in a parallel, fixed-space relationship by the structure;
   an electrically-conductive inner element supported by the structure between and parallel to the outer elements; and
   means for exciting the outer elements with an alternating voltage;
   wherein the spacing of the inner element with respect to the outer elements varies differentially with respect to each outer element in response to the load on the structure;

wherein a signal is provided by the inner element indicative of the differential spacing of the inner element with respect to the outer elements;

wherein the structure includes a relatively movable bending beam flexure portion responsive to the load and has a relatively immovable portion;

wherein the outer elements are supported by the relatively immovable portion of the structure; and wherein the inner element is supported by the relatively movable bending beam flexure portion of the structure, 2. A load cell according to claim 1, wherein: the load is the weight of an article.

3. A load cell according to claim 2, wherein: the article is a mailpiece.

4. A load cell according to claim 1, further comprising:

means for determining the differential spacing of the inner element with respect to the outer elements in response to the signal from the inner element according to the formula:

$$Vo(s) = Vi(s)(1/d1)/[(1/d1)+(1/d2)];$$

wherein:
Vi is the excitation voltage for the outer elements;
(s) is the laplacian operator;
Vo is the signal from the inner element;
d1 is the distance between one of the outer elements and the inner element; and
d2 is the distance between the other of the outer elements and the inner element.

5. A load cell according to claim 1, wherein:
the outer elements are similar, flat plates having a surface area, A;
the inner element is a flat plate having a surface area of substantially A parallel to the surface of the first element; and
the inner element is interleaved between the outer elements in such a manner that their surface areas are substantially aligned.

6. A load cell according to claim 5, wherein:
the surface area of each of the elements is substantially greater than the distance between the inner element and either of the outer elements.

7. A load cell according to claim 5, wherein the inner element is bifurcated longitudinally wherein:
the inner element is bifurcated longitudinally into two electrically distinct portions, each portion adapted to provide a signal in response to the excitation of the outer elements indicative of its differential spacing with respect to the outer elements.

8. A load cell for providing a signal indicative of a load, comprising:
a structure responsive to a load;
two electrically-conductive, closed surface, outer elements supported in a parallel, fixed-space relationship by the structure;
an electrically-conductive inner element supported by the structure between and parallel to the outer elements; and
means for exciting the outer elements with an alternating voltage;
wherein the spacing of the inner element with respect to the outer elements varies differentially with respect to each outer element in response to the load on the structure;
wherein a signal is provided by the inner element indicative of the differential spacing of the inner element with respect to the outer elements;
wherein the outer elements are similar, flat plates having a surface area, A;
wherein the inner element is a flat plate having a surface area of substantially A parallel to the surface of the first element; and
the inner element is interleaved between the outer elements in such a manner that their surface areas area substantially aligned; and
wherein the inner element is bifurcated longitudinally into two electrically distinct portions, each portion adapted to provide a signal in response to the excitation of the outer elements indicative of its differential spacing with respect to the outer elements.

* * * * *